United States Patent
Sasse

(10) Patent No.: US 6,851,531 B2
(45) Date of Patent: Feb. 8, 2005

(54) HYDRODYNAMIC CLUTCH DEVICE

(75) Inventor: Christoph Sasse, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/433,988

(22) PCT Filed: Jan. 15, 2002

(86) PCT No.: PCT/EP02/00314

§ 371 (c)(1),
(2), (4) Date: Jun. 10, 2003

(87) PCT Pub. No.: WO02/063186

PCT Pub. Date: Aug. 15, 2002

(65) Prior Publication Data

US 2004/0020735 A1 Feb. 5, 2004

(30) Foreign Application Priority Data

Jan. 22, 2001 (DE) .......................................... 101 02 718

(51) Int. Cl.$^7$ ............................................. F16H 45/02
(52) U.S. Cl. ................................... 192/3.29; 192/70.18
(58) Field of Search .............................. 192/3.28, 3.29, 192/3.3, 70.18

(56) References Cited

U.S. PATENT DOCUMENTS

| 6,264,018 B1 | 7/2001 | Matsuoka | |
|---|---|---|---|
| 6,293,380 B1 | 9/2001 | Arhab | |
| 6,688,441 B1 * | 2/2004 | Arhab et al. ................. | 192/3.29 |
| 6,708,804 B2 * | 3/2004 | Krause et al. ............. | 192/3.29 |
| 6,742,638 B2 * | 6/2004 | Maienschein et al. ..... | 192/3.29 |

FOREIGN PATENT DOCUMENTS

| FR | 1.258.842 | 2/1960 |
|---|---|---|
| FR | 1.258.842 | 4/1961 |
| FR | 2 797 012 A | 2/2001 |
| JP | 2000230625 | 8/2000 |
| JP | 2000320642 | 11/2000 |
| WO | WO 00/03158 A | 1/2000 |
| WO | WO 01/07799 A1 | 2/2001 |
| WO | WO 01/07801 A1 * | 2/2001 |

* cited by examiner

*Primary Examiner*—Saul Rodriguez
(74) *Attorney, Agent, or Firm*—Cohen, Pontani, Lieberman & Pavane

(57) ABSTRACT

A hydrodynamic clutch device, in particular a torque converter or fluid clutch, includes a housing, a turbine wheel in the housing, and a torque-converter lock-up clutch, which is used to selectively produce a torque-transfer connection between the turbine wheel and the housing. The torque-converter lock-up clutch includes at least one substantially annular friction element, which is connected to the turbine wheel in order to rotate with the latter about a rational axis, the element having a friction surface region and a contact element. The contact element is connected to the housing in order to rotate with the latter about the rotational axis and impinges upon the friction surface region of the friction elements to produce the torque-transfer connection between the turbine wheel and the housing. The contact element is connected to the housing assembly in a rotationally rigid manner in a zone lying radially outside the friction surface region.

26 Claims, 2 Drawing Sheets

HYDRODYNAMIC CLUTCH DEVICE

PRIORITY CLAIM

This is a U.S. national stage of application No. PC/EP02/00314, filed on 15 Jan. 2002. Priority is claimed on that application and on the following application: Country: Germany, Application No.: 101 02 718.4, filed: Jan. 22, 2001.

BACKGROUND OF THE INVENTION

1. Field of the Invention

The invention relates to a hydrodynamic coupling device, in particular a torque converter or fluid clutch, comprising: a housing arrangement, a turbine wheel provided in the housing arrangement, a lockup clutch arrangement enabling the optional production of a torque transmission connection between the turbine wheel and the housing arrangement, the lockup clutch arrangement comprising: at least one essentially annular friction element which is connected to the turbine wheel for rotation together about an axis of rotation and has a friction surface region, and a contact element which is connected to the housing arrangement for rotation together about the axis of rotation and can be used to act upon the frictional surface region of the at least one friction element to produce the torque transmission connection between the turbine wheel and housing arrangement.

2. Description of the Related Art

In hydrodynamic coupling devices of this type, particularly in a state in which at least part of the torque to be transmitted via a drive train is passed from the housing arrangement to the turbine wheel via the lockup clutch arrangement, torsional vibrations occurring in the drive system can be intercepted by the fact that a certain slip is permitted in the lockup clutch arrangement, so that torque peaks can lead to a relative rotation between the housing arrangement and the turbine wheel. This results in a comparatively large load on the components or surface regions which act frictionally on one another in the region of the lockup clutch arrangement, since the power loss which occurs at least when the torque fluctuations are relatively large and is intercepted by slip is converted into heat. In order to be able to meet the requirement for ever greater possible power losses in the region of the lockup clutch arrangement, systems have been developed as described, for example, in WO 00/03158, which corresponds to U.S. Pat. No. 6,293,380. In the hydrodynamic torque converter known from this publication, the lockup clutch arrangement has two friction elements which are coupled to the turbine wheel for rotation together and between which an intermediate friction element, which is coupled to the housing arrangement for rotation together, is positioned. The clutch piston which is joined to the housing arrangement radially within the friction surface region and acts as a contact element is used to bring the individual friction surface regions of the friction elements, of the intermediate friction element, of the clutch piston and of the housing arrangement into mutual interaction. The provision of a plurality of staggered friction surface pairings which can be brought into interaction with one another enables the friction surface made available as a whole to be significantly increased without taking up a substantial amount of structural space. This has the effect that even the power loss occurring in the slip mode can be distributed over a relatively large surface area and can therefore be better and more rapidly dissipated.

A disadvantage of the known coupling devices of the above-described type is that a connecting arrangement which "goes around" the outer circumference of the contact element is provided for connecting the friction element or friction elements to the turbine wheel. This connection takes up structural space and increases the weight of the coupling device. In addition, the arrangement of the additional mass in the radially outer region results in a particularly marked increase in the mass moment of inertia of the turbine wheel.

A further disadvantage of the known coupling device in view of the overall weight is the mounting of the radially inner region of the contact element on a section protruding for this purpose axially from the housing arrangement into its interior space.

OBJECT OF THE INVENTION

It is an object of the invention to simplify the construction of a hydrodynamic coupling device of the type described at the beginning.

SUMMARY OF THE INVENTION

The invention makes provision for the contact element to be connected radially outside the friction surface region to the housing arrangement in a manner such that they essentially rotate together.

In the coupling device according to the invention, the joining of the contact element radially outside the friction surface region provides the possibility, without a significant additional outlay, of connecting the friction element or friction elements to the turbine wheel in a substantially simpler manner. In particular, the friction elements can be joined to the turbine wheel without going around the radially outer circumference of the contact element, with the result that the mass of the coupling device and the mass moment of inertia of the turbine wheel are kept small.

The contact element is preferably connected to the housing arrangement via an elastic device, in particular a tangential leaf spring arrangement. In order for an elastic device of this type to make possible a comparatively high transmission of torque between the contact element and the housing arrangement, this device should be arranged in a radially outer region of the contact element. In the case of a tangential leaf spring arrangement, it is expedient to provide the outer circumference of the contact element with radial indentations, so that, during the installation of the coupling device, the leaf springs can be first of all fastened, for example riveted, to radial tabs of the contact element, which tabs remain on the outer circumference, in order subsequently to connect free ends of the leaf springs, which ends are situated in the region of the radial indentations, to an axially extending inner surface of the housing arrangement. Riveting of the ends of the leaf springs to the housing preferably takes place on housing pins which are formed by local deformation (for example pressing in) of the housing material.

The contact element can preferably be displaced axially on the turbine wheel and is mounted rotatably relative to the turbine wheel. This avoids a projection of the housing arrangement or an additional component provided in known coupling devices for the mounting of the contact element. In view of the contact element being driven by pressurization, this measure also permits a fluid seal between the inner circumference of the contact element and the turbine wheel. The contact element is preferably mounted here on the circumferential surface of a hub of the turbine wheel.

A particularly simple construction is produced if the at least one friction element is connected to the turbine wheel, if desired via a torsional vibrational damper, radially within the friction surface region in a manner such that they essentially rotate together. For example, the friction element may comprise a friction element carrier section which extends radially inward from the friction surface region. If a plurality of friction elements are provided, each of these elements may have a friction element carrier section running in this manner. However, it is also conceivable for a friction element carrier section to be provided which extends radially inward, is common to the friction elements and is connected at its inner circumference to the turbine wheel, in particular the turbine wheel hub, and, at its outer circumference, bears a friction element driver for carrying along the individual friction elements, in particular for carrying them along in a form-fitting manner. A common friction element carrier can be connected to the turbine wheel by means of a welded joint. It should be noted here that, if there is a welded joint in the region of the turbine wheel hub, any deformation in the region of the turbine wheel shell is advantageously avoided.

The friction element carrier section or sections should extend essentially axially in order to save on material. However, it is entirely possible to provide a profile which deviates therefrom, in particular an essentially rectilinearly sloping profile, for example in order to bridge an axial offset between the friction surface region and that point at which the connection to the turbine wheel takes place.

The connection to the turbine wheel preferably takes place via a radial toothing which is preferably provided between the friction element (or friction element carrier) and a circumferential surface of a turbine wheel hub.

In one embodiment, a plurality of friction elements is provided, an intermediate friction element, which is connected to the contact element in a manner such that they essentially rotate together, being arranged in each case between the friction surface regions of two mutually adjacent friction elements. The connection to the contact element in a manner such that they essentially rotate together ensures in a simple manner that the intermediate friction element is carried along when the housing arrangement is rotated. Each intermediate friction element or an intermediate friction element carrier common to a plurality of intermediate friction elements extends in a manner such that it engages in carry-along cutouts of the contact element. In a development of this embodiment, the carry-along cutouts are formed by radial indentations (already mentioned above) on the outer circumference of the contact element thus giving them a further function.

A construction which can be realized in a particularly simple manner for a hydrodynamic coupling device operating on the principle of a dual line system can be obtained by an interior space of the housing arrangement being divided by the contact element into a first spatial region in which the turbine wheel is arranged, and into a second spatial region, and by it being possible, in order to replace working fluid provided in the interior space, for working fluid to be introduced into the first spatial region and for working fluid to be removed from the second spatial region, or vice versa. In order, in a system of this type, to permit an exchange of fluid in spite of a radially outer sealing of the contact element by the friction surface regions resting on one another in the engaged state of the lockup clutch arrangement, it is proposed to provide at least one fluid passage opening in the contact element radially within the friction surface region to permit an exchange of fluid between the first spatial region and the second spatial region. Furthermore, in order to improve cooling of the fluid in the engaged or slipping state, it is furthermore proposed that a flow duct arrangement preferably designed with a curved shaping is provided in the friction surface region of the at least one friction element. This flow duct arrangement is preferably open toward the two spatial regions, so that a difference in pressure present in any case in these clutch states between the two spatial regions makes it possible for fluid to pass through the flow duct arrangement and, in the process, the thermal energy arising in this spatial region can be efficiently dissipated.

Of course, the coupling device according to the invention may also be designed as what is referred to as a three-line system, in which two fluid lines are provided for the exchange of fluid and a further fluid line is provided for the actuation of the clutch piston in a manner controlled by fluid pressure.

In the coupling device according to the invention, provision is preferably made for the housing arrangement to have a shaping matched to the contour of the lockup clutch arrangement with an axial bulge in the region of the lockup clutch arrangement. The consequence of this measure is that the housing arrangement is designed with relatively great rigidly particularly in its region also provided for the lockup clutch arrangement and for the action thereof. This leads to a significantly smaller bulging or to a significantly smaller swelling of the housing arrangement under the fluid pressure prevailing in the housing interior. It is therefore not possible for a load on the edges of friction linings or the like induced by bulging to occur, even if the friction surface regions are relatively wide in the radial direction.

In order to couple the coupling device according to the invention to a drive shaft, a coupling element is provided which is of essentially annular design, is joined in its radially inner region to an outer side of the housing arrangement, preferably by laser welding, and is designed in its radially outer region for coupling to a second coupling element which is connected fixedly or can be connected to a drive shaft.

To obtain a favorable distribution of masses with the consequence of a smaller mass moment of inertia or to increase the friction surface regions, provision can be made for a ratio of a flow outside diameter in the region of the turbine wheel to a friction outside diameter of the at least one friction element to be in the range of from 1.30 to 1.80, preferably 1.35 to 1.70, and/or for a ratio of a friction outside diameter of the at least one friction element to a friction inside diameter of the at least one friction element to be in the range of from 1.10 to 1.30, preferably 1.15 to 1.25.

DETAILED DESCRIPTION OF THE PRESENTLY PREFERRED EMBODIMENTS

Figure 1:
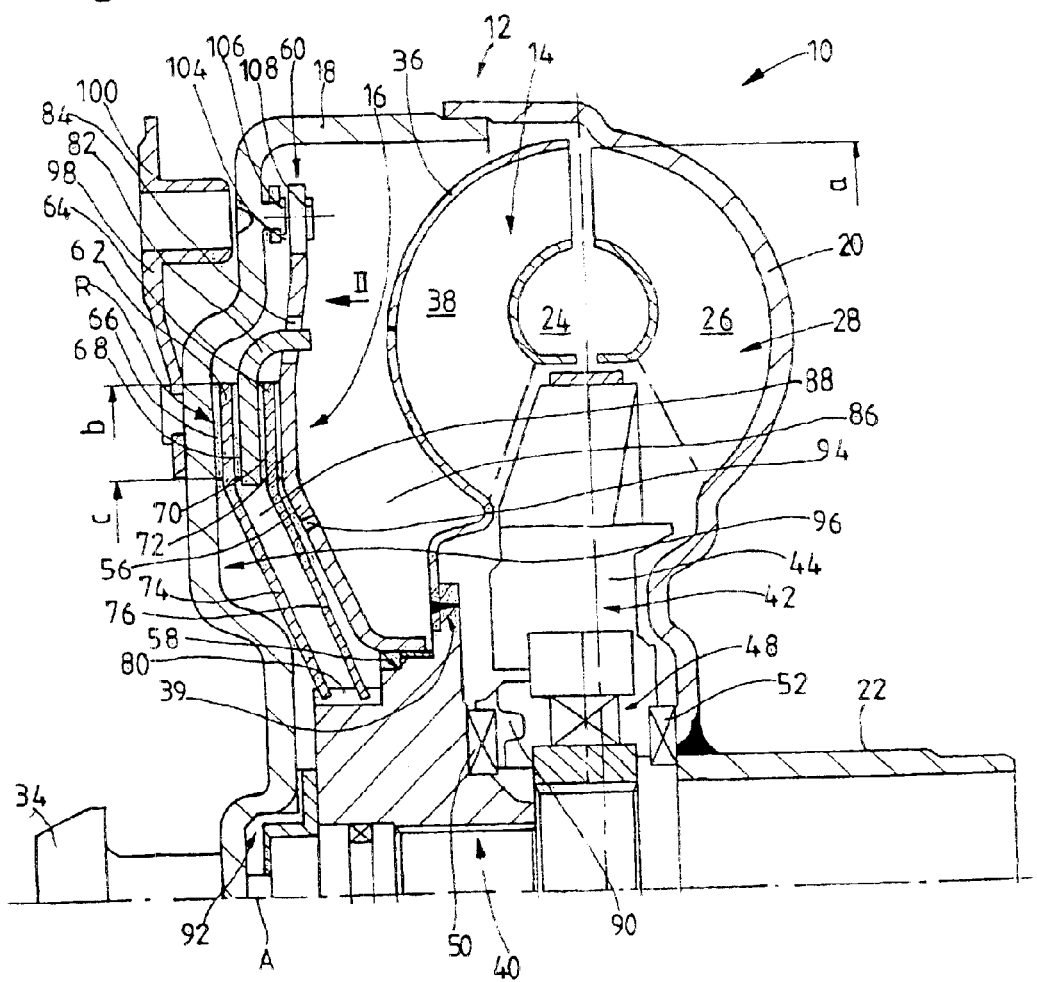
FIG. 1 shows a view of a partial axial section of a hydrodynamic coupling device according to the invention.

FIG. 1 shows a hydrodynamic torque converter 10 comprising a housing arrangement 12, a turbine wheel 14 provided in the housing arrangement 12 and a lockup clutch arrangement 16.

The housing arrangement 12 comprises a housing cover 18 which is connected fixedly in its radially outer region to an impeller shell 20 by means of a welded joint, for example.

Radially to the inside, the impeller shell 20 is connected fixedly to an impeller hub 22. On its inner side facing the housing interior space 24, the impeller shell 20 bears a plurality of impeller blades 26 following one another in the circumferential direction. The impeller shell 20 together with the impeller hub 22 and the impeller blades 26 essentially forms an impeller 28. The housing cover 18 is provided on its outer side with a centering pin 34 which is arranged coaxially with an axis of rotation A and is inserted into a corresponding centering recess of a drive shaft (not illustrated), for example a crankshaft of an internal combustion engine, so as to align the axis of rotation A of the torque converter 10 with respect to the axis of rotation of the drive shaft.

The turbine wheel 14 is arranged in the interior space 24 of the converter 10 and comprises, in the radially outer region, a turbine wheel shell 36 which bears a multiplicity of turbine wheel blades 38 on its side facing the impeller 28. Radially to the inside, the turbine wheel shell 36 is connected fixedly to a turbine wheel hub 40, for example by means of a welded joint or screw connection at 39. The turbine wheel hub 40 in turn, can be connected in a rotationally fixed manner to an output shaft, for example to a transmission input shaft.

A stator 42 is provided axially between the impeller 28 and the turbine wheel 14. The stator 42 comprises, on a stator ring 44, a multiplicity of stator blades 46 which are positioned between the radially inner end regions of the impeller blades 26 and the turbine wheel blades 38. The stator ring 44 is supported via a free wheeling arrangement 48 on a supporting element (not illustrated), for example a hollow supporting shaft, in a manner such that it can rotate in one direction about the axis of rotation A, but such that it is blocked against rotation in the other direction of rotation. In the axial direction, the stator 42 is supported axially via two bearing arrangements 50, 52 with respect to the impeller 28 on one side and with respect to the turbine wheel 14 on the other side.

The lockup clutch arrangement 16 is used to produce a direct, mechanical torque transmission connection between the turbine wheel 14 and the housing arrangement 12 and comprises a coupling piston 56, which can be displaced axially by means of a radially inner cylindrical section on an outer circumferential surface of the turbine wheel hub 40 via a sliding bearing 58 and is mounted rotatably relative to the turbine wheel 14. The clutch piston 56 is connected at its radially outer end region to the housing cover 18 via an elastic arrangement, a tangential leaf spring arrangement 60 in the arrangement illustrated, in a manner such that they essentially rotate together. The clutch piston 56 is thereby held in an axially moveable manner with respect to the housing cover 18.

The lockup clutch arrangement 16 furthermore comprises two disk or friction elements 62, 64 bearing friction linings 66, 68, 70, 72 on the two axial end surfaces in each case in their radially outer region. In their radially inner region, each friction element 62, 64 comprises a friction element carrier section 74, 76 which extends radially inward from a friction surface region R defined by the extent of the friction linings 66, 68, 70, 72. In the exemplary embodiment illustrated, the friction element carrier sections 74, 76 are formed integrally with those sections of the friction element 62, 64 which bear the friction linings. The friction element carrier sections 74, 76 are designed on their radially inner end region with an internal toothing which is in engagement for carrying-along purposes with a corresponding external toothing 80 of the turbine wheel hub 40. A connection between the friction elements 62, 64 and the turbine wheel 14 in a manner such that they essentially rotate together is therefore provided.

An intermediate friction element 82 lies axially between the two friction elements 62, 64 and extends radially outward from the friction surface region R in a manner such that it engages in carry-along cutouts 84 of the clutch piston 56. A connection between the intermediate friction element 82 and the clutch piston 56, and therefore the housing arrangement 12, in a manner such that they rotate together, is therefore created.

The interior space 24 of the housing arrangement 12 is divided by the clutch piston 56 into a first spatial region 86 in which the turbine wheel 14 is arranged, and into a second spatial region 88. To produce the lockup state, the fluid pressure in the spatial region 86 is increased beyond the fluid pressure prevailing in the spatial region 88. To increase the fluid pressure in the spatial region 86, fluid can be introduced into the spatial region 86 by a fluid pump (not illustrated) via a passage opening arrangement 90 in the region of the stator 42 and via an intermediate space formed, for example, between the output shaft (not illustrated) and a hollow supporting shaft. In the nonlockup state, the fluid can then enter into the spatial region 88 from the spatial region 86 by flowing around the friction elements 62, 64 and can flow through the output shaft via a passage opening arrangement 92 guiding the fluid radially inward, and from there to a fluid reservoir (not illustrated). In order also to permit an exchange of fluid in the lockup state, in which the pressure of the clutch piston 56 leads to a fluid seal in the region of the friction linings 66, 68, 70, 72, at least one fluid passage opening 94 is provided radially within the friction surface region R in the clutch piston 56 and permits the exchange of fluid between the first spatial region 86 and the second spatial region 88. Furthermore, the friction linings 66, 68, 70, 72 may have lining grooves having a curved profile, for example, which grooves are open in the radially outer region toward the spatial region 86 and are open in the radially inner region toward the spatial region 88 with the result that the frictional heat produced in the region of the friction linings 66, 68, 70, 72 can be dissipated more rapidly by the throughflow of fluid even in the completely locked up or slipping state.

In order to obtain a further minimization of the mass moment of inertia, the friction outside diameter b of the friction linings 66, 68, 70, 72 is kept comparatively small. Thus, in the preferred case, a ratio of the fluid flow outside diameter a, which corresponds approximately to the outside diameter of the turbine wheel 32, to the friction outside diameter b has a value in the range of from 1.35 to 1.70.

Furthermore, the ratio between the friction outside diameter b and the friction inside diameter c of the friction linings 66, 68, 70, 72 preferably lies in a range of 1.15 to 1.25. This results in a comparatively large radial extent of the friction linings, which are of annular design, and therefore in a comparatively large possible power loss in the region of the lockup clutch arrangement.

The housing arrangement 12 has a shaping matched to the contour of the lockup clutch arrangement 16 with an axial bulge 96 in the region of the lockup clutch arrangement 16. An advantageous stiffening of the housing arrangement 12 is therefore provided by the contour of the housing cover 18, which is bent radially on both sides of this bulge 96. The consequence of this is that bulging or swelling of the housing 12 with the disadvantageous consequence of a load on the edge in the region of the outer friction lining 66 can be avoided by the working fluid, which is provided under pressure in the interior space 24. Instead of the axial bulge 96 it is also possible, as an alternative, to provide an axial indentation which can be used to obtain the same advantageous effect and, moreover, to further reduce the axial structural space. In the latter case, it is favorable, for the purpose of optimally using the structural space, if the friction surface region R of the lockup clutch arrangement 16 is completely arranged radially within the radial sensor of the turbine wheel shell 36.

It should be emphasized that the torque converter 10 may, of course, also have more than two friction elements 62, 64, for example three friction elements, than a correspondingly greater number of intermediate friction elements 82. Also possible for just one friction element to be used.

A further advantage of the torque converter 10 which is illustrated lies in the manner in which it is joined to a drive shaft. FIG. 1, on the left, shows a coupling element 98 which is of annular design and is designed such that it is bent at right angles, for example in the axial direction, and is formed, for example, from sheet metal. In its radially inner region, this coupling element 98 is attached to the outer side of the housing cover 18, preferably by laser welding.

The laser welding is advantageous here, since it results in virtually no deformation of the housing cover 18, and any deformation in the region in which the housing cover 18 provides a friction surface on its inner side would be disadvantageous. In its radially outer region, the coupling element 98 bears a plurality of nut elements 100 or the like, into which screw bolts or the like can be screwed in order to connect the coupling element 98 to a flexible plate or the like, it being possible for a plate of this type to be screwed in a manner known per se in its radially inner region onto a drive shaft, for example a crankshaft flange.

Figure 2:
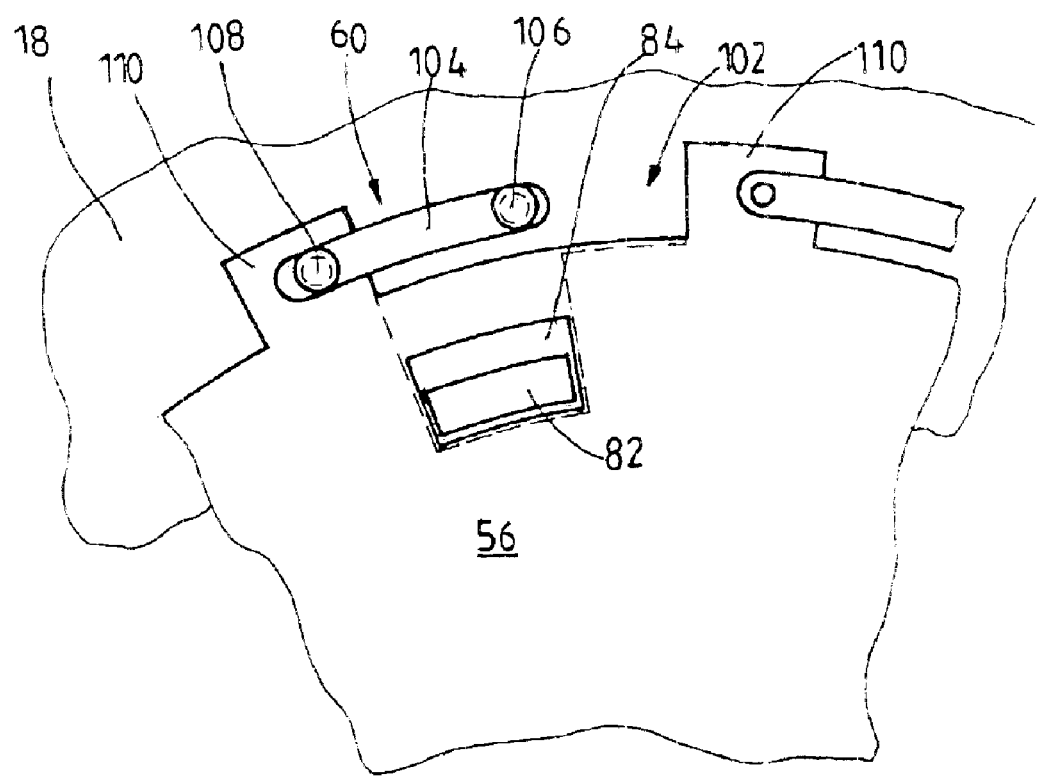
FIG. 2 shows a view of a detail in the direction of the arrow II in FIG. 1.

FIG. 2 shows a view identified by II in FIG. 1 in the region of the connection between the clutch piston 56 and the inner side of the housing cover 18 in a manner such that they essentially rotate together. One of a plurality of radial indentations 102, in the region of which a housing end of a tangential leaf spring 104 is joined in each case to a cover pin 106 by riveting is seen on the outer circumference of the clutch piston 56. The piston end of the tangential leaf spring 104 is fastened to radial tabs 110 of the clutch piston 56 by a rivet connection at 108. A plurality of tangential leaf springs 104 are thereby distributed over the circumference of the clutch piston 56 and ensure axial displaceability of the clutch piston 56, which is required during operation of the lockup clutch arrangement 16.

The carry-along cutouts 84 of the clutch piston 56 are likewise distributed in the circumferential direction and have radially outwardly protruding tabs of the intermediate friction element 82 engaging in them. As an alternative, these carry-along cutouts 84 may also be provided in each case by a section (for example the bottom) of the radial indentations 102, for example as illustrated by dashed lines in FIG. 2.

In a preferred embodiment, the cover pins 106, as illustrated in FIG. 1, are formed by pressing in the housing cover 18.

Of course, changes may be undertaken in various regions of the coupling device according to the invention without departing from the principles of the invention. For example, the intermediate friction element or elements could also be coupled in a rotationally fixed manner to the housing cover. A friction element carrier common to the friction elements could also be provided radially within the friction surface region, said carrier holding the individual friction elements in an axially displaceable manner and being coupled in a rotationally fixed manner in its radially inner region to the turbine wheel. A friction element carrier of this type may also be designed as a torsion or vibration damper in order to satisfy particular requirements concerned with vibration.

What is claimed is:

1. A hydrodynamic coupling device comprising:
   a housing rotatable about an axis of rotation;
   a turbine wheel arranged for rotation about said axis of rotation in said housing; and
   a lock-up clutch for transmitting torque between the turbine wheel and the housing, said lock-up clutch comprising
   a plurality of essentially annular friction elements connected to said trubine wheel for rotation with said turbine wheel about said axis of rotation, each said friction element having at least one friction surface region;
   a contact element connected to said housing radially outside of said friction surface regions for rotation essentially together with said housing about said axis of rotation, said contact element being engageable with said friction surface region to transmit torque between the turbine wheel and the housing; and
   an intermediate friction element extending radially between friction surface regions of each pair of adjacent said friction elements, each said intermediate friction element being connected to said element for rotation essentially together with said contact element.

2. A hydrodynamic coupling device as in claim 1 wherein the contact element is connected to said housing by a tangential leaf spring arrangement.

3. A hydrodynamic coupling device as in claim 1 wherein said contact element can move axially with respect to said turbine wheel and can rotate with respect to said turbine wheel.

4. A hydrodynamic coupling device as in claim 1 wherein said at least one friction element is connected to said turbine wheel radially inside of said friction surface region so that said at least one friction element and said turbine wheel can rotate together.

5. A hydrodynamic coupling device as in claim 4 wherein each said at least one friction element comprises a carrier section which extends radially inward from the friction surface region.

6. A hydrodynamic coupling device as in claim 5 further comprising radial teeth connecting said carrier section to said turbine wheel.

7. A hydrodynamic coupling device as in claim 6 wherein said turbine wheel comprises a hub, said carrier section comprising a circumferential section facing said hub, said radial teeth being provided on said carrier section and on said hub.

8. A hydrodynamic coupling device as in claim 1 wherein said contact element is provided with cut-outs, each said intermediate friction element engaging in said cut-outs.

9. A hydrodynamic clutch device as in claim 1 wherein said housing comprises an axial bulge which conforms to the shape of the lock-up clutch.

10. A hydrodynamic clutch device as in claim 1 further comprising a first coupling element having a radially inner region connected to said housing and a radially outer region which can be connected to a drive shaft.

11. A hydrodynamic coupling device as in claim 1 wherein said turbine wheel has a flow outside diameter and said at least one friction element has a friction outside diameter and a friction inside diameter, said flow outside diameter having a ratio to said friction outside diameter of 1.30 to 1.80.

12. A hydrodynamic coupling device as in claim 11 wherein said ratio is 1.35 to 1.70.

13. A hydrodynamic coupling device as in claim 1 wherein said turbine wheel has a flow outside diameter and said at least one friction element has a friction outside diameter and a friction inside diameter, said friction outside diameter having a ratio to said friction inside diameter of 1.10 to 1.30.

14. A hydrodynamic coupling device as in claim 13 wherein said ratio is 1.15 to 1.25.

15. A hydrodynamic coupling device comprising:
a housing rotatable about an axis of rotation, said housing having an interior space;
a turbine wheel arranged for rotation about said axis of rotation in said housing; and
a lock-up clutch for transmitting torque between the turbine wheel and the housing, said lock-up clutch comprising
at least one essentially annular friction element connected to said turbine wheel for rotation with said turbine wheel about said axis of rotation, each said friction element having a friction surface region;
a contact element connected to said housing radially outside of said friction surface region for rotation essentially together with said housing about said axis of rotation, said contact element being engageable with said friction surface region to transmit torque between the turbine wheel and the housing, said contact element dividing said interior space into a first spatial region in which the turbine wheel is arranged and a second spatial region; and
at least one fluid passage in said contact element radially inside of said friction surface regions for transferring fluid between said first and second spatial regions.

16. A hydrodynamic coupling device as in claim 15 wherein said at least one friction element is connected to said turbine wheel radially inside of said friction surface region so that said at least one friction element and said turbine wheel can rotate together.

17. A hydrodynamic coupling device as in claim 15 wherein said turbine wheel has a flow outside diameter and said at least one friction element has a friction outside diameter and a friction inside diameter, said flow outside diameter having a ratio to said friction outside diameter of 1.30 to 1.80.

18. A hydrodynamic coupling device as in claim 17 wherein said ratio is 1.35 to 1.70.

19. A hydrodynamic coupling device as in claim 15 wherein said turbine wheel has a flow outside diameter and said at least one friction element has a friction outside diameter and a friction inside diameter, said friction outside diameter having a ratio to said friction inside diameter of 1.10 to 1.30.

20. A hydrodynamic coupling device as in claim 19 wherein said ratio is 1.15 to 1.25.

21. A hydrodynamic coupling device comprising:
a housing rotatable about an axis of rotation, said housing having an interior space;
a turbine wheel arranged for rotation about said axis of rotation in said housing; and
a lock-up clutch for transmitting torque between the turbine wheel and the housing, said lock-up clutch comprising
at least one essentially annular friction element connected to said turbine wheel for rotation with said turbine wheel about said axis of rotation, each said friction element having a friction surface region;
a contact element connected to said housing radially outside of said friction surface region for rotation essentially together with said housing about said axis of rotation, said contact element being engageable with said friction surface region to transmit torque between the turbine wheel and the housing, said contact element dividing said interior space into a first spatial region in which the turbine wheel is arranged and a second spatial region; and
at least one curved flow duct in the friction surface region of at least one said friction element for transferring fluid between said first and second spatial regions.

22. A hydrodynamic coupling device as in claim 21 wherein said at least one friction element is connected to said turbine wheel radially inside of said friction surface region so that said at least one friction element and said turbine wheel can rotate together.

23. A hydrodynamic coupling device as in claim 21 wherein said turbine wheel has a flow outside diameter and said at least one friction element has a friction outside diameter and a friction inside diameter, said flow outside diameter having a ratio to said friction outside diameter of 1.30 to 1.80.

24. A hydrodynamic coupling device as in claim 23 wherein said ratio is 1.35 to 1.70.

25. A hydrodynamic coupling device as in claim 21 wherein said turbine wheel has a flow outside diameter and said at least one friction element has a friction outside diameter and a friction inside diameter, said friction outside diameter having a ratio to said friction inside diameter of 1.10 to 1.30.

26. A hydrodynamic coupling device as in claim 25 wherein said ratio is 1.15 to 1.25.

* * * * *